(12) United States Patent
Mori et al.

(10) Patent No.: US 8,478,113 B2
(45) Date of Patent: Jul. 2, 2013

(54) VIDEO SERVER

(75) Inventors: Toshiki Mori, Kodaira (JP); Shuichi Yamaguchi, Kunitachi (JP); Toshio Suzuki, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 351 days.

(21) Appl. No.: 13/016,516

(22) Filed: Jan. 28, 2011

(65) Prior Publication Data

US 2011/0231886 A1    Sep. 22, 2011

(30) Foreign Application Priority Data

Mar. 17, 2010 (JP) ................. 2010-061529

(51) Int. Cl.
*H04N 7/56* (2006.01)
*H04N 9/80* (2006.01)
*G06F 15/16* (2006.01)
*G06F 15/173* (2006.01)

(52) U.S. Cl.
USPC ........... 386/293; 386/291; 386/295; 386/296; 386/298; 386/299; 386/239; 709/201; 709/203; 709/224; 709/231; 709/245

(58) Field of Classification Search
USPC ................. 386/291, 293, 295, 296, 298, 299, 386/239; 709/201, 203, 224, 231, 245
See application file for complete search history.

(56) References Cited

U.S. PATENT DOCUMENTS

| 2003/0028893 | A1* | 2/2003 | Addington ................ 725/115 |
| 2005/0273489 | A1* | 12/2005 | Pecht et al. .................. 709/203 |
| 2007/0189708 | A1* | 8/2007 | Lerman et al. ............... 386/52 |
| 2008/0079801 | A1* | 4/2008 | Eri ............................. 348/14.09 |
| 2008/0101763 | A1* | 5/2008 | Bhogal et al. ................ 386/83 |
| 2008/0109850 | A1* | 5/2008 | Gibbon et al. ................ 725/46 |
| 2010/0104258 | A1* | 4/2010 | Amsterdam et al. .......... 386/83 |
| 2011/0142417 | A1* | 6/2011 | Wilson et al. ................ 386/250 |
| 2011/0276557 | A1* | 11/2011 | Chen et al. .................... 707/706 |

FOREIGN PATENT DOCUMENTS

| JP | 05-030188 | 2/1993 |
| JP | 2001-027990 | 1/2001 |
| JP | 2001-101108 | 4/2001 |
| JP | 2003-228533 | 8/2003 |
| JP | 2008-028629 | 2/2008 |
| JP | 2008-210308 | 9/2008 |
| JP | 2009-151680 | 7/2009 |

OTHER PUBLICATIONS

Office Action in corresponding Japanese Patent Application No. 2010-061529 dated Jan. 19, 2012, including English translation, 4 pages total.
Notification for Filing Opinion in corresponding Korean Patent Application No. 10-2011-0020058 dated Jun. 28, 2012. including English translation, 7 pages total.

* cited by examiner

*Primary Examiner* — Daquan Zhao
(74) *Attorney, Agent, or Firm* — Finnegan, Henderson, Farabow, Garrett & Dunner, LLP (57) ABSTRACT

According to one embodiment, a video server includes a plurality of processors and a log data integration unit. Each of the plurality of processors includes a generation module, a storage module, and a transmission module. The generation module generates the log data including at least an event occurrence time. The storage module stores the log data. The transmission module transmits the log data stored in the storage module to the log data integration unit via the common bus. The log data integration unit includes a reception module and an integration module. The reception module receives the log data from the plurality of processors via the common bus. The integration module integrates the received log data in an occurrence time order.

9 Claims, 12 Drawing Sheets

VIDEO SERVER

CROSS-REFERENCE TO RELATED APPLICATIONS

This application is based upon and claims the benefit of priority from Japanese Patent Application No. 2010-061529, filed Mar. 17, 2010; the entire contents of which are incorporated herein by reference.

FIELD

Embodiments described herein relate generally to a video server used in, for example, a production/editing system of materials for broadcast programs.

BACKGROUND

As can be seen from digital terrestrial broadcasting, digitization of the broadcast field has advanced. Digital program materials require larger data sizes as image quality becomes higher, and a video server used to store these materials is required to have a larger capacity and multi-channels. For this reason, the video server is required to have higher processing capability, and includes a plurality of CPUs in place of a single CPU.

In the video server including the plurality of CPUs to improve its processing capability, log data such as trace logs and operation logs are distributed to and recorded in the respective CPUs. For this reason, it becomes difficult to recognize the processing status of the overall server.

DETAILED DESCRIPTION

In general, according to one embodiment, a video server includes a plurality of processors and a log data integration unit. Each of the plurality of processors includes a generation module, a storage module, and a transmission module. The generation module generates the log data including at least an event occurrence time. The storage module stores the log data. The transmission module transmits the log data stored in the storage module to the log data integration unit via the common bus. The log data integration unit includes a reception module and an integration module. The reception module receives the log data from the plurality of processors via the common bus. The integration module integrates the received log data in an occurrence time order.

Embodiments will be described in detail hereinafter with reference to the drawing.

Figure 1:
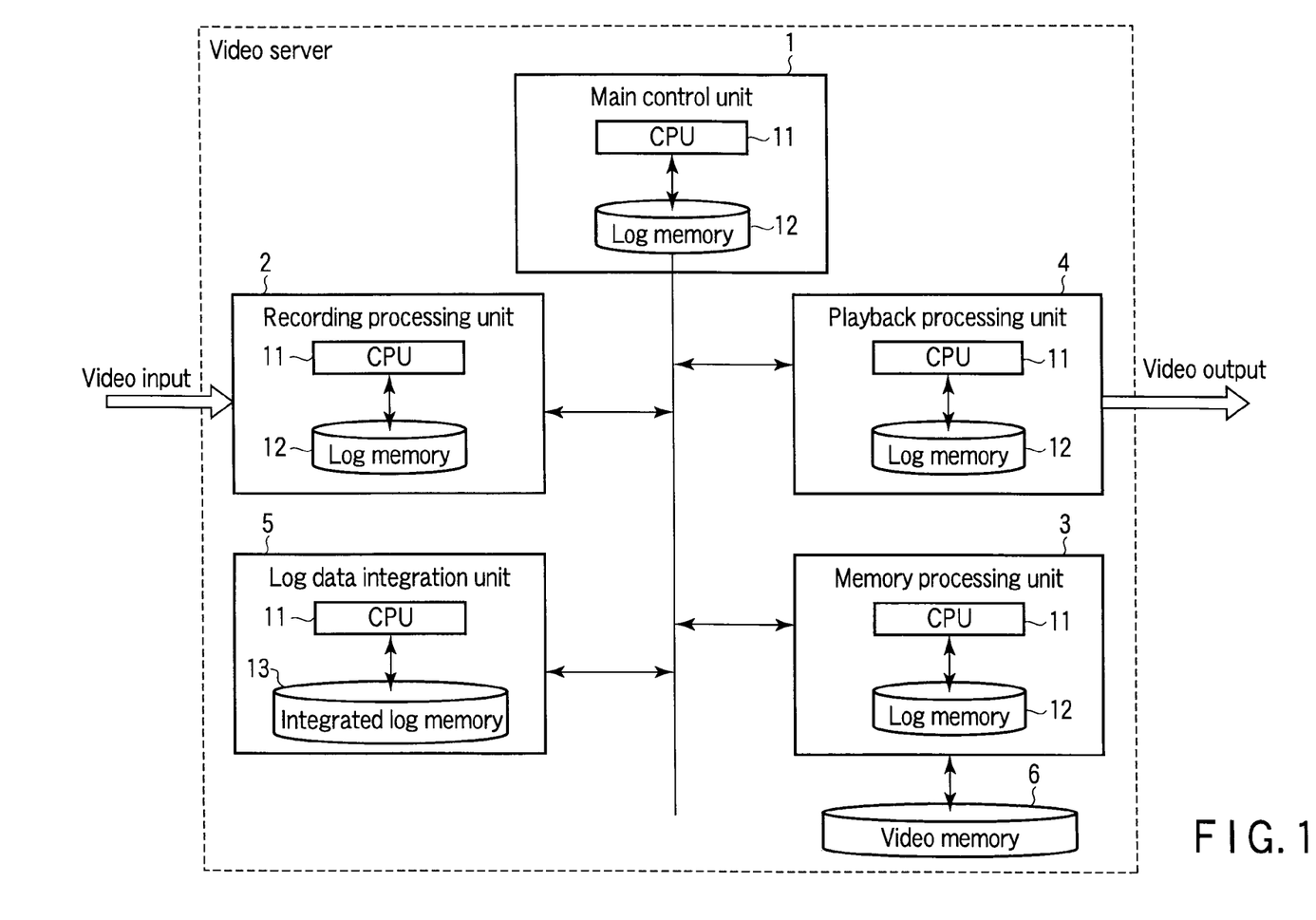
FIG. 1 is a block diagram showing the arrangement of a video server according to an embodiment.

FIG. 1 is a block diagram showing the arrangement of a video server according to one embodiment. This video server includes a main control unit 1 which controls the overall server, a recording processing unit 2 to which a camera or video deck is connected and which fetches and encodes a video signal, a memory processing unit 3 which executes read/write processing of the video data fetched by the recording processing unit 6 from/to a video memory 6, and a playback processing unit 4 which decodes the video data read out from the memory processing unit 3 into a video signal, and outputs the video signal. The video memory 6 is configured by an electronic recording medium such as a flash memory.

Figure 2:
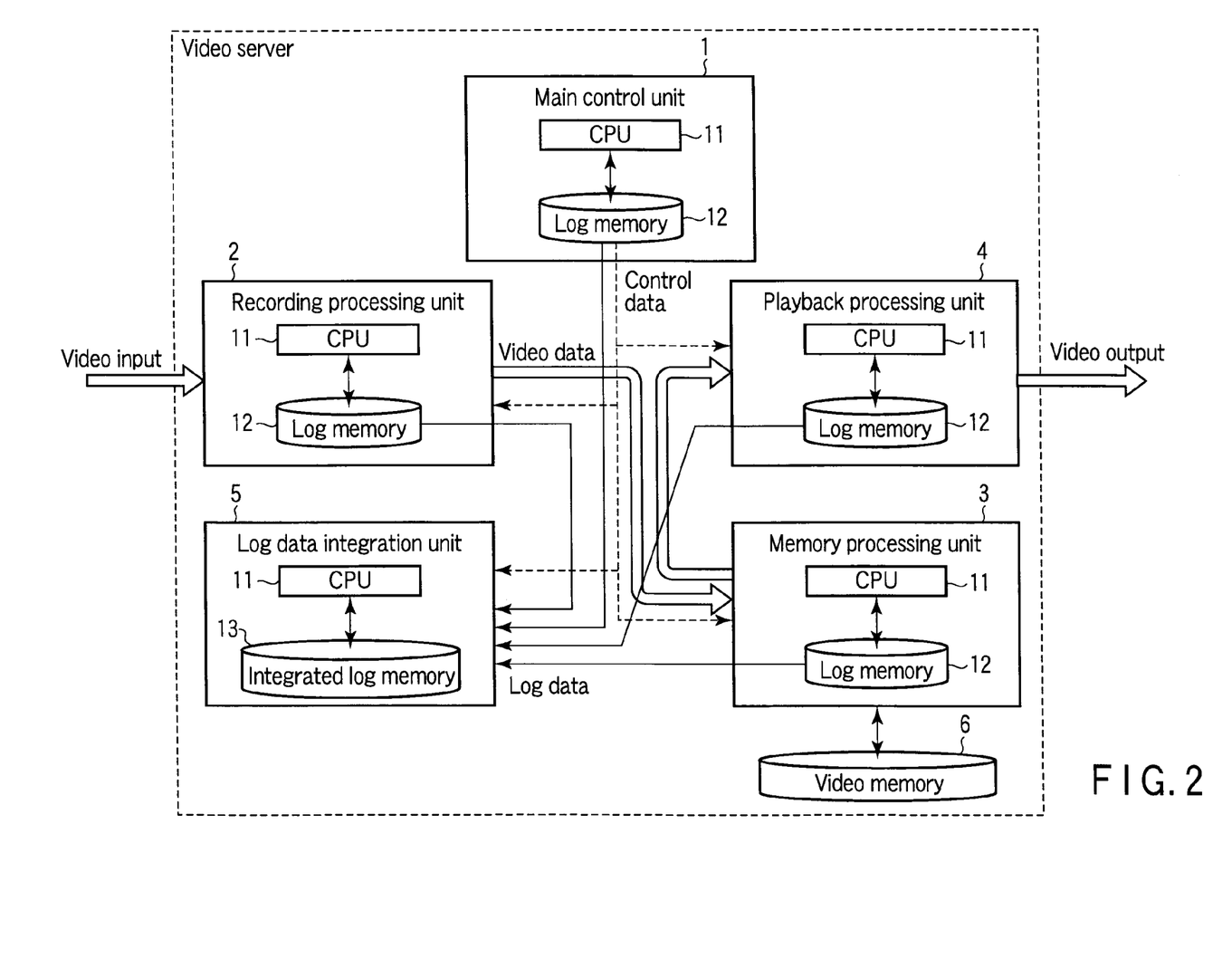
FIG. 2 is a block diagram showing data transmission paths of the video server shown in FIG. 1.

FIG. 2 shows data transmission paths of the video server shown in FIG. 1.

Main functions of the video server include recording and playback of a video picture. In a recording mode, a control signal from the main control unit 1 instructs the recording processing unit 2 to fetch a video signal, and the recording processing unit 2 executes encoding processing (for example, MPEG2) of the video signal. At the same time, the main control unit 1 instructs the memory processing unit 3 to execute write processing of video data, and the memory processing unit 3 executes the write processing in the video memory 6.

In a playback mode, a control signal from the main control unit 1 instructs the memory processing unit 3 to read out video data from the video memory 6. At the same time, the main control unit 1 instructs the playback processing unit 4 to decode the readout video data. Then, the playback processing unit 4 decodes the video data encoded by a compression encoding method such as MPEG2 to a video signal, and outputs the video signal.

Recently, the video server requires higher processing capability since it is required to have higher picture quality, a larger data capacity, and multi-channel inputs and outputs. Hence, the video server is configured by a plurality of processing units, each of which includes a CPU 11, and which are connected to each other via a common bus.

For the purpose of recognizing the use status of the server and probing causes at the time of occurrence of operation problems, the server generates log data as records of processing contents. In the arrangement shown in FIG. 1, since the respective processing units include the CPUs 11, log data are distributed to and recorded in the respective CPUs 11. For this reason, it is difficult to recognize the processing status of the overall server.

In order to solve this problem, log data, which are distributed to and recorded in the respective processing units, are collected in a log data integration unit 5, as shown in FIG. 2. Since the respective processing units transmit log data to the log data integration unit 5 when they save log data in their log memories 12, the log data can be integrated at one location.

In this case, since log data has a relatively larger data size than information used to control each CPU, if inter-CPU exchange processing is executed intact, control data exchange processing is temporarily forced to wait during log data exchange processing to generate, for example, delays of control timing, thus posing a problem such as video omissions in the recording/playback operations as the main functions of the video server.

Figure 3:
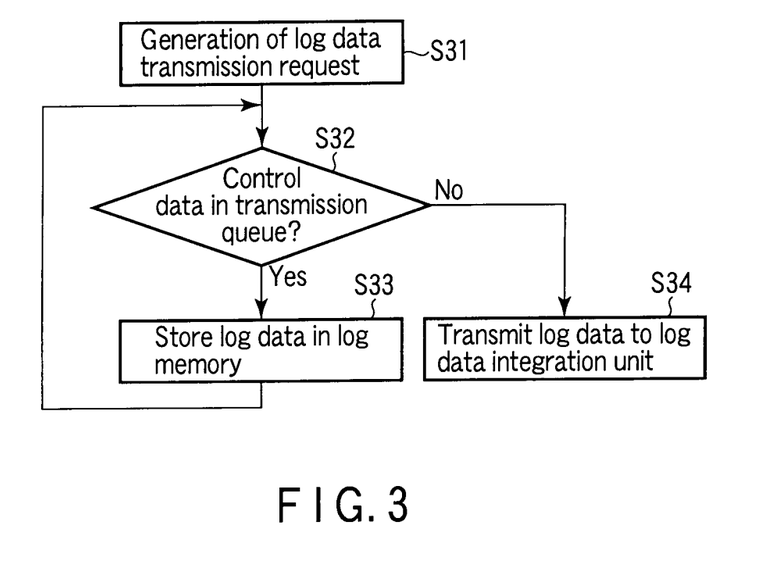
FIG. 3 is a flowchart showing transmission processing of log data in respective processing units.

Hence, the respective processing units of the video server execute the log data exchange processing, as shown in FIG. 3. When a log data transmission request is generated (step S31), each processing unit determines whether or not transmission processing of control data, which is transmitted from the main control unit 1 to each processing unit and is required to control, for example, the recording/playback operation, is active (step S32). If there is no control data in a transmission queue, the processing unit executes transmission processing of log data (step S34).

If there is control data in a transmission queue in step S32, each processing unit stores log data in its internal log memory 6 (step S33), and waits until the transmission queue becomes empty. By transmitting log data by such operation, even when the transmission/reception timing of log data overlaps that of control data required for recording/playback processing, the log data can be transmitted without influencing the recording/playback processing.

Figure 4:
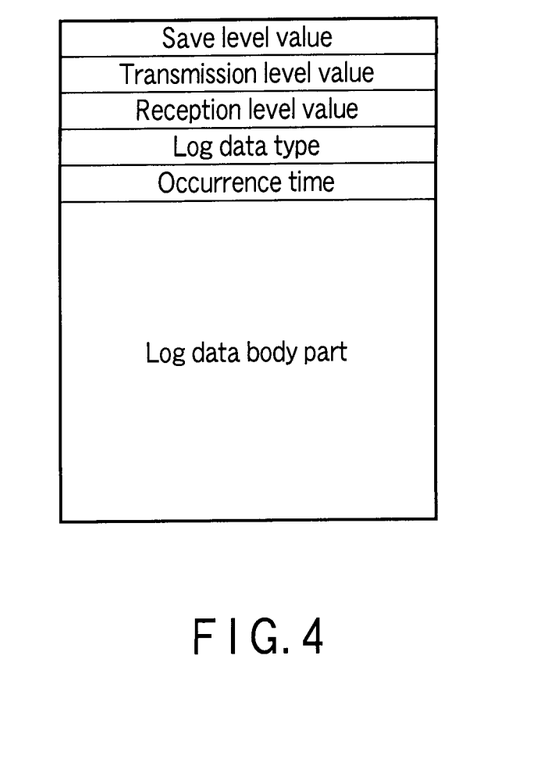
FIG. 4 is a view showing an example of the configuration of log data.

The configuration of log data will be described below. FIG. 4 shows an example of the configuration of log data generated by each processing unit. In FIG. 4, the log data includes an occurrence time, save level value, transmission level value, reception level value, and log data type as needed in addition to a log data body part indicating the contents of an event which has occurred in the CPU 11 of each processing unit. Details of log data integration processing will be described hereinafter according to respective embodiments.

First Embodiment

Figure 5:
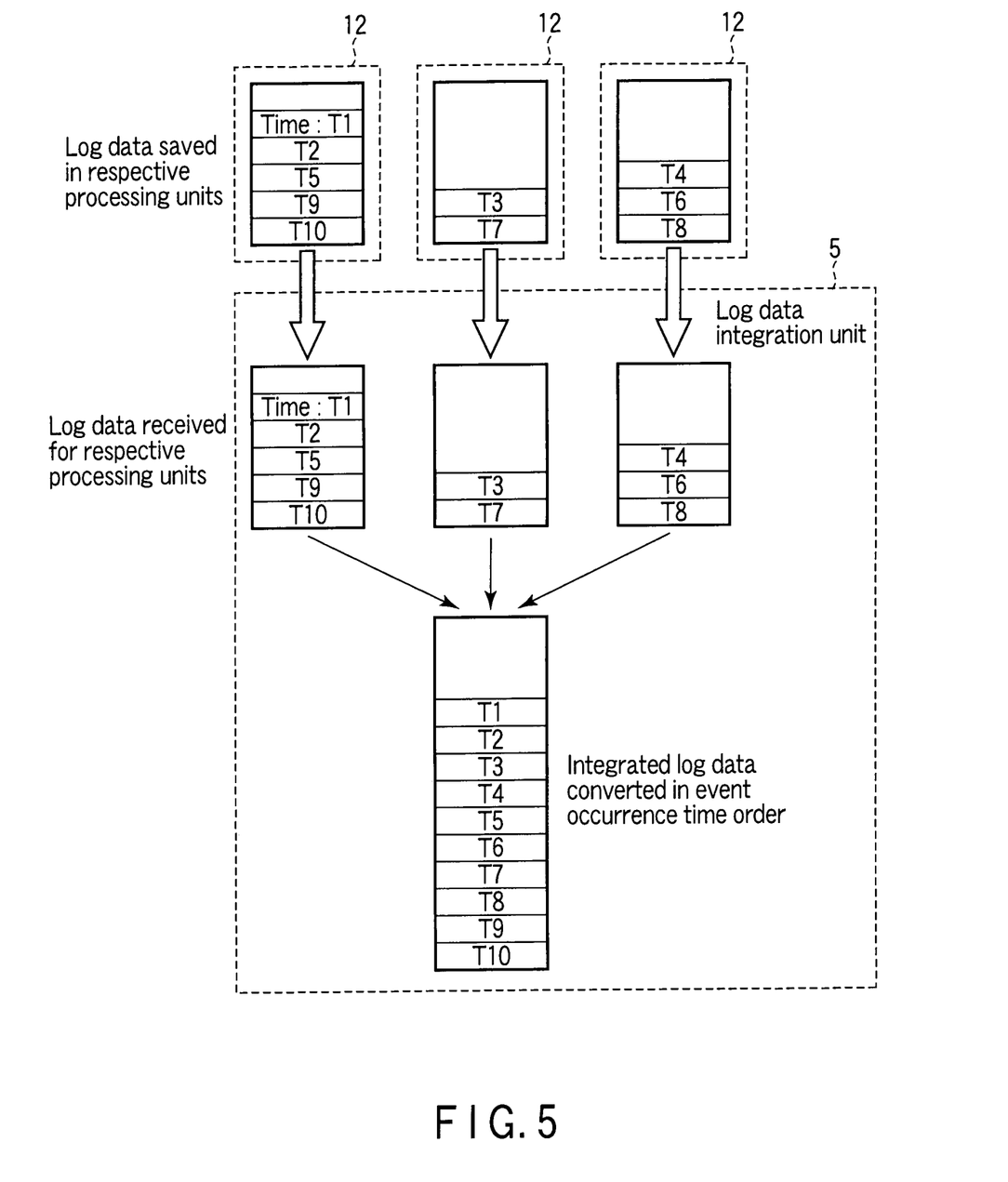
FIG. 5 is a view for explaining the operation of the first embodiment.

Log data, which are asynchronously collected from the plurality of processing units, are not always sorted in an occurrence time order, resulting in poor convenience. Hence, the log data includes information of an occurrence time of an event, as shown in FIG. 4, and log data integration processing is executed, as shown in FIG. 5.

Log data saved in the log memories 12 of the respective processing units are transmitted to the log data integration unit 5, which generates integrated data based on the received log data. At the time of this integration, since received data from the respective processing units are sorted in an occurrence time order, as shown in FIG. 5, processing for comparing oldest times of respective data and adding log data having the oldest time to integrated data is repeated to integrate a plurality of data into one log data in an occurrence time order, thus obtaining convenient log data.

Second Embodiment

When all log data collected by the respective processing units are collected, a data size becomes too large to press against the storage capacity of an integrated log memory 13 of the log data integration unit 5. When log data exchange amounts from the respective processing units become large, the band of the common bus is squeezed. Since the integrated log data represents the operation status of the overall server, all log data saved in the log memories 12 by the respective processing units need not always be integrated. Hence, a selection method of data to be integrated will be described below.

Figure 6:
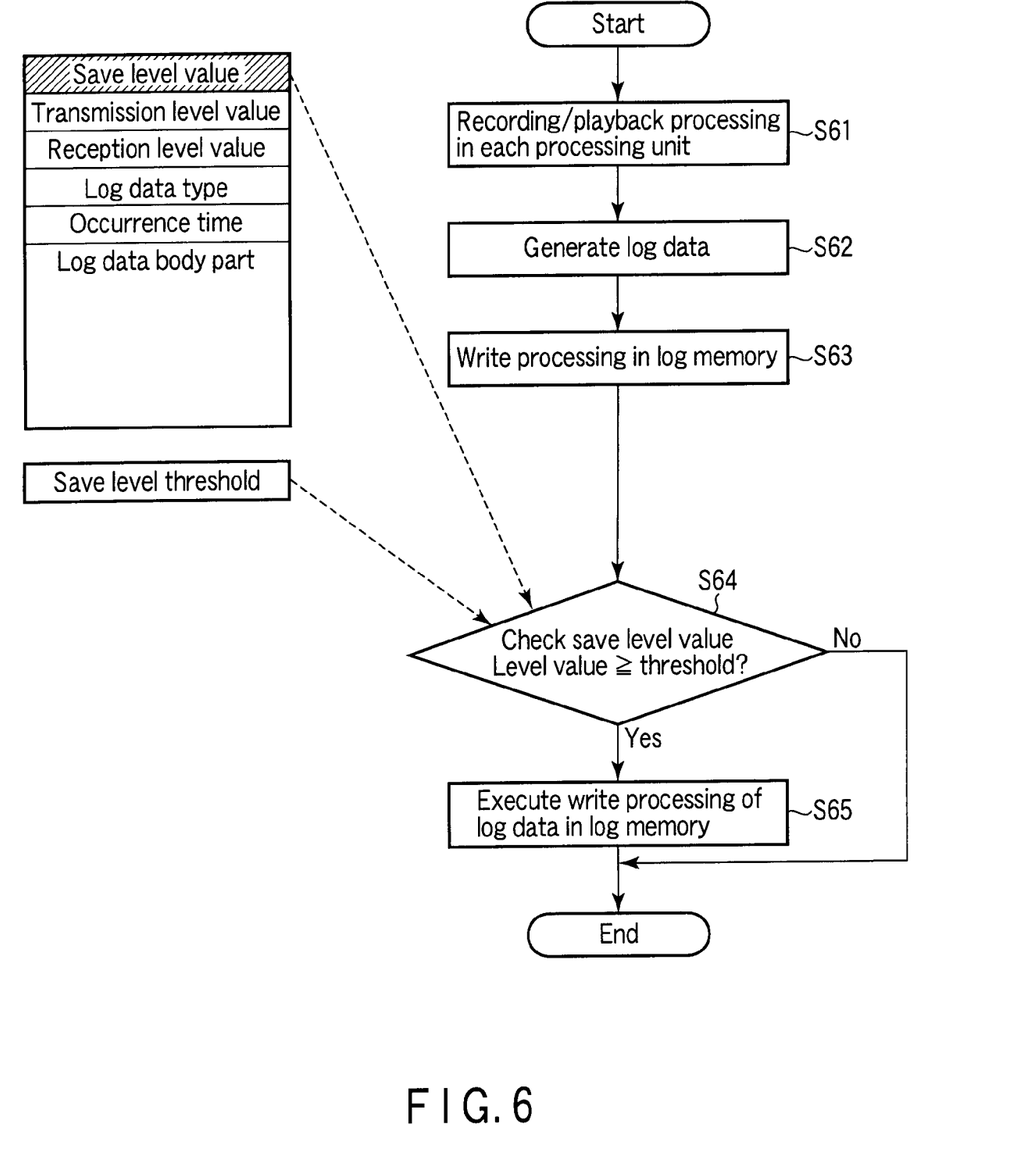
FIG. 6 is a flowchart showing log data saving processing according to the second embodiment.

FIG. 6 is a flowchart showing selection processing executed when each processing unit saves log data. When, for example, recording/playback processing is activated in each processing unit (step S61), log data is generated (step S62). The CPU 11 of that processing unit sets a save level value in the log data to be generated according to a degree of importance of the processing, which generated the log data. For instance, the degree of importance of the log data of the processing that terminates normally is low, and the importance of the log data of the processing that terminates abnormally is high. Because it is necessary to keep the log data when processing terminates abnormally.

The generated log data undergoes write processing in the log memory 12 of that processing unit (step S63). In this case, the save level value is checked. That is, the save level value in the log data is compared with a save level threshold, which is set in advance according to the installation/operation mode of the server (step S64). If it is determined that save level value≧save level threshold, the log data is written in the log memory 12 (step S65). If it is determined that save level value<save level threshold, the processing ends without saving the log data. With this control, each processing unit can select log data to be saved, and can delete log data with a low degree of importance.

Third Embodiment

Figure 7:
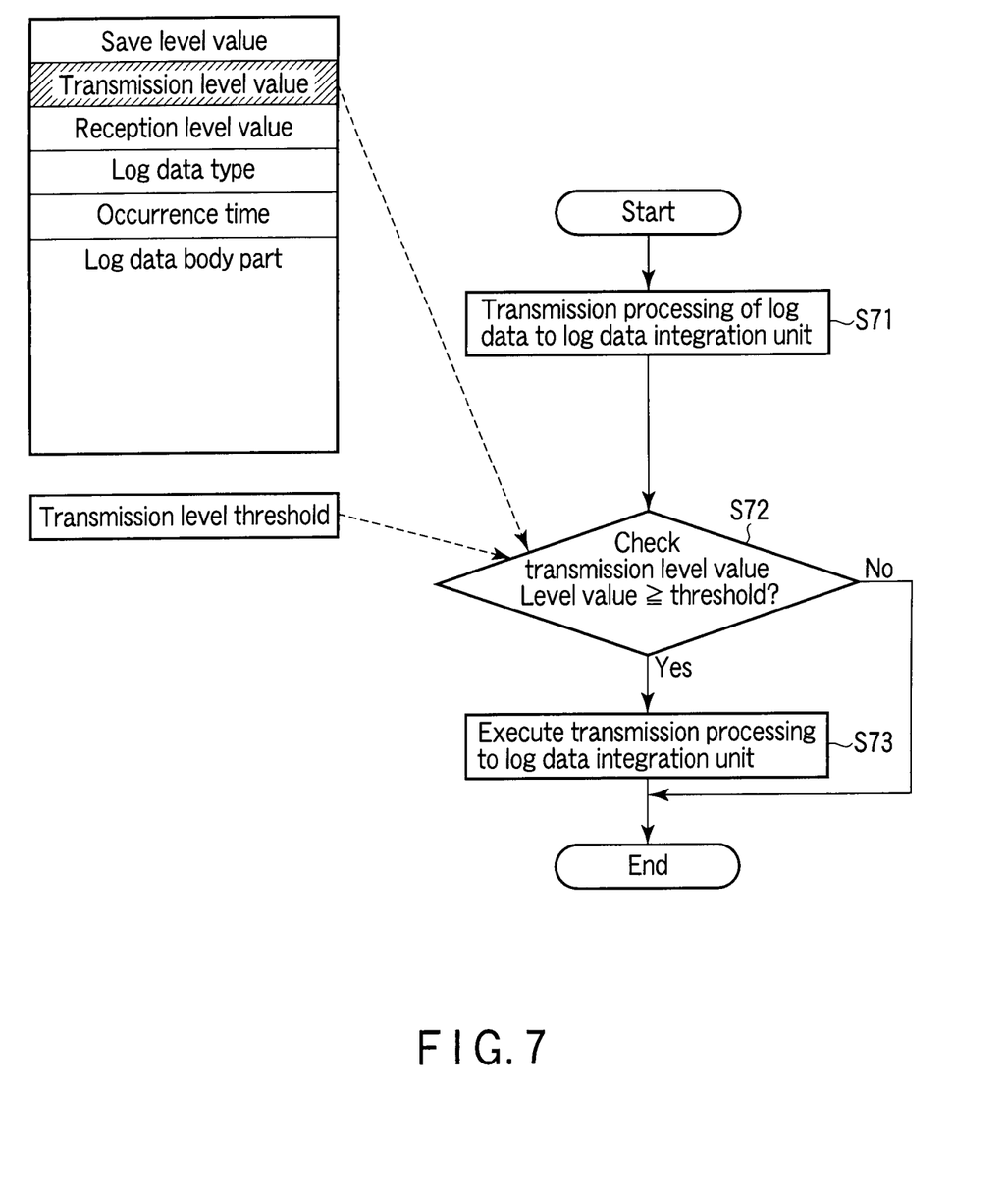
FIG. 7 is a flowchart showing log data transmission processing according to the third embodiment.

FIG. 7 is a flowchart showing selection processing executed when log data saved in each processing unit are transmitted to the log data integration unit 5. The CPU 11 of each processing unit sets a transmission level value in log data to be generated according to a degree of importance of the processing, which generated log data. For instance, the degree of importance of the log data of the processing that terminates normally is low, and the importance of the log data of the processing that terminates abnormally is high. Because it is necessary to keep the log data when processing terminates abnormally.

When transmission processing of log data saved by each processing unit to the log data integration unit 5 is executed (step S71), the transmission level value is checked. That is, the transmission level value in the log data is compared with a transmission level threshold, which is set in advance according to the installation/operation mode of the server (step S72). If it is determined that transmission level value≧transmission level threshold, the transmission processing to the log data integration unit 5 is executed (step S73). If it is determined that transmission level value<transmission level threshold, the processing ends without any transmission processing.

With this control, the degree of importance of log data to be transmitted can be easily changed by changing the transmission level threshold. Detailed log data specialized to the operation of each processing unit can be left in the log memory 12 of that processing unit, and log data indicating the operation of the overall server can be left in the integrated log memory 13 of the log data integration unit 5, thus allowing to selectively use log data as usage.

Fourth Embodiment

Figure 8:
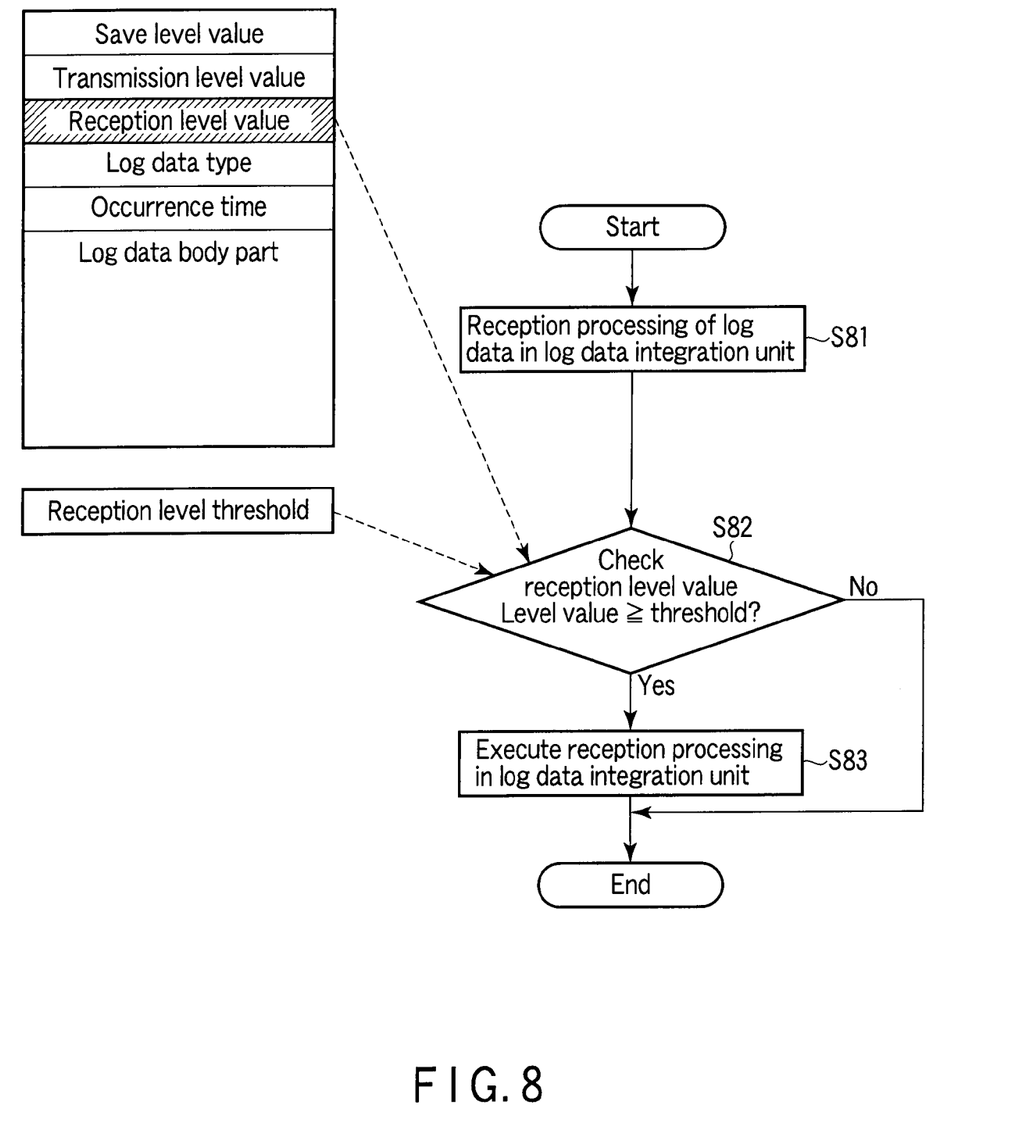
FIG. 8 is a flowchart showing log data reception processing according to the fourth embodiment.

FIG. 8 is a flowchart showing selection processing executed at the time of reception by the log data integration unit 5 when log data saved in the respective processing units are transmitted to the log data integration unit 5. The CPU 11 of each processing unit sets a reception level value in log data to be generated according to a degree of importance of the processing which generated the log data. For instance, the degree of importance of the log data of the processing that terminates normally is low, and the importance of the log data of the processing that terminates abnormally is high. Because it is necessary to keep the log data when processing terminates abnormally.

The log data integration unit 5 checks the reception level value in processing for receiving log data from the respective processing units (step S81). That is, the reception level value in the log data is compared with a reception level threshold which is set in advance according to the installation/operation mode of the server (step S82). If it is determined that reception level value≧reception level threshold, reception processing in the log data integration unit 5 is executed (step S83). If it is determined that reception level value<reception level threshold, a log data body part is not received.

According to the fourth embodiment, the level of log data to be received and saved can be easily changed by changing the reception level threshold. With this control as well, detailed log data specialized to the operation of each processing unit can be left in the log memory 12 of that processing unit, and log data indicating the operation of the overall server can be left in the integrated log memory 13 of the log data integration unit 5, thus allowing to selectively use log data as usage.

Fifth Embodiment

Figure 9:
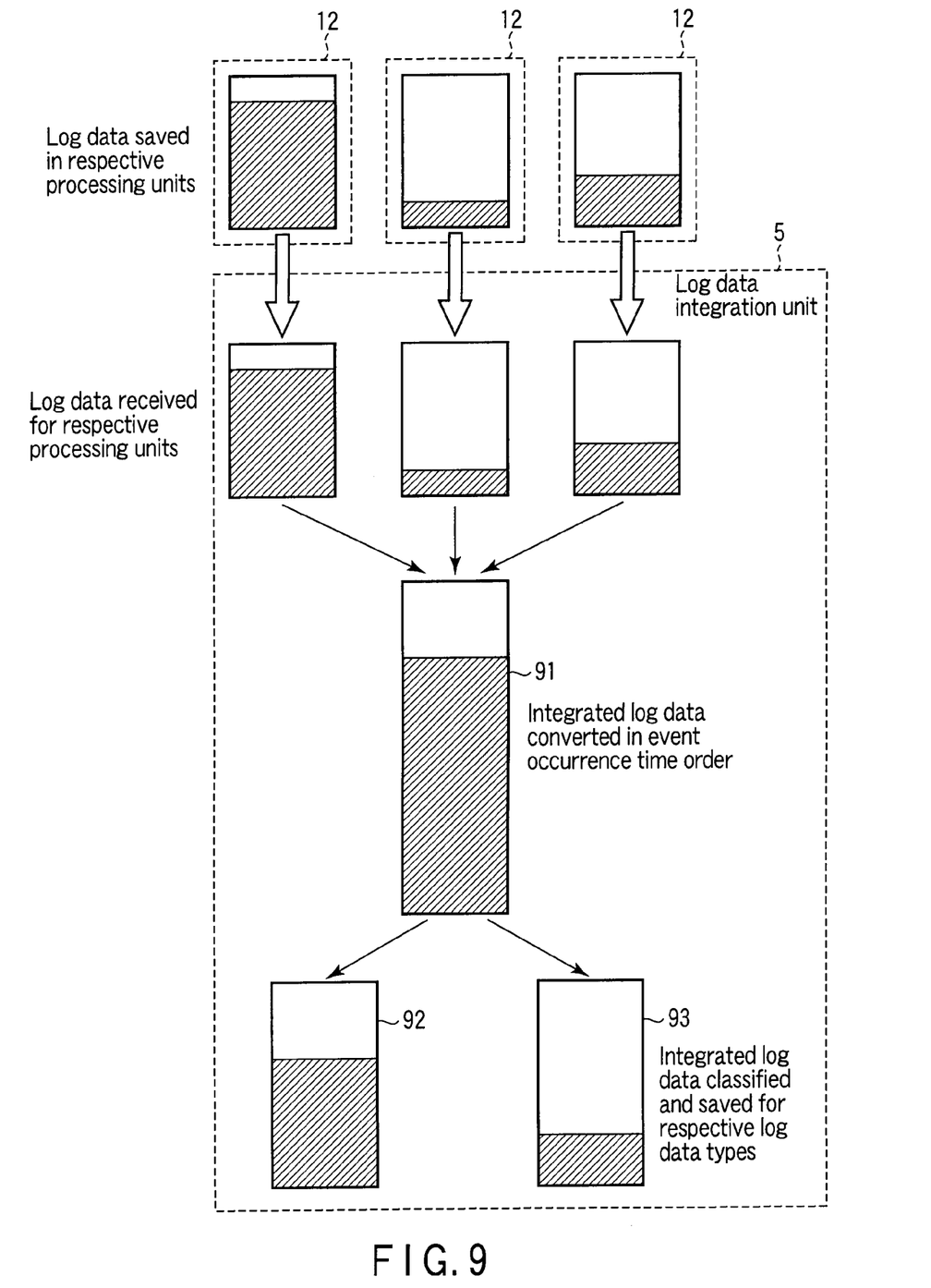
FIG. 9 is a view for explaining the operation of the fifth embodiment.

The first to fourth embodiments have explained the method of integrating log data by the log data integration unit 5. However, by classifying and saving log data based on causes of generation of logs, convenient log data can be collected. For example, as one use purpose, log data generated in normal operations and those generated at the time of occurrence of problems may be separately saved. FIG. 9 shows the operation in this case.

The operation until log data 91 which is converted in an event occurrence time order is generated is the same as that in the first embodiment described using FIG. 5. Details of processing for generating log data 92 and 93 which are divided for respective causes of generation from this log data 91 will be described below with reference to the flowchart shown in FIG. 10.

Figure 10:
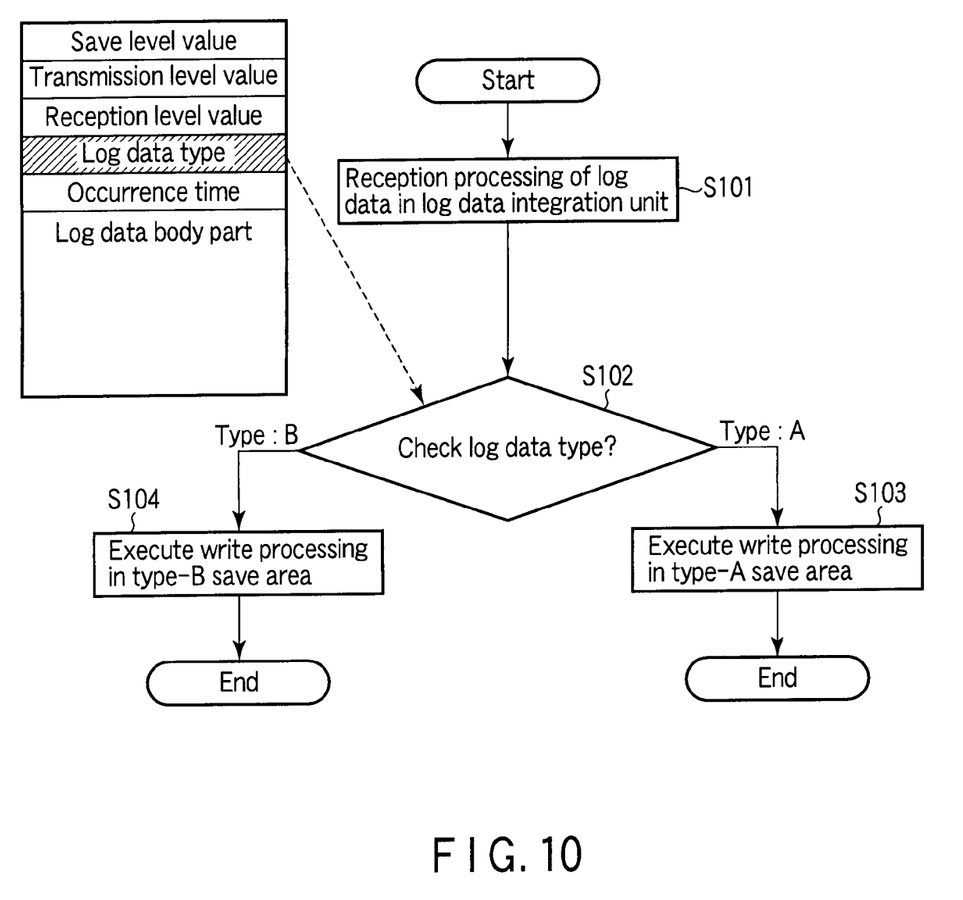
FIG. 10 is a flowchart showing log data reception processing according to the fifth embodiment.

The CPU 11 of each processing unit sets a log data type (type A/type B) in log data to be generated depending on whether the processing contents in that processing unit which generated the log data indicate a normal operation or an operation at the time of occurrence of a problem. In processing for receiving log data collected from the respective processing units to the log data integration unit 5 (step S101), the log data types in log data are determined (step S102), and the log data are saved in the integrated log memory 13 while being classified for respective log data types. In the determination processing in step S102, if type A is determined, the corresponding log data is saved in a type-A save area of the integrated log memory 13 (step S103); if type B is determined, the corresponding log data is saved in a type-B save area of the integrated log memory 13 (step S104).

With this control, for example, since log data generated in normal operations and those generated at the time of occurrence of problems can be separately saved, log data generated at the time of occurrence of problems need only be checked for the purpose of checking problem causes, thus allowing to collect convenient log data. Also, log data at the time of problems can be prevented from being overwritten by those in normal operations, thus securely storing data which are important to specify problems.

Sixth Embodiment

Figure 11:
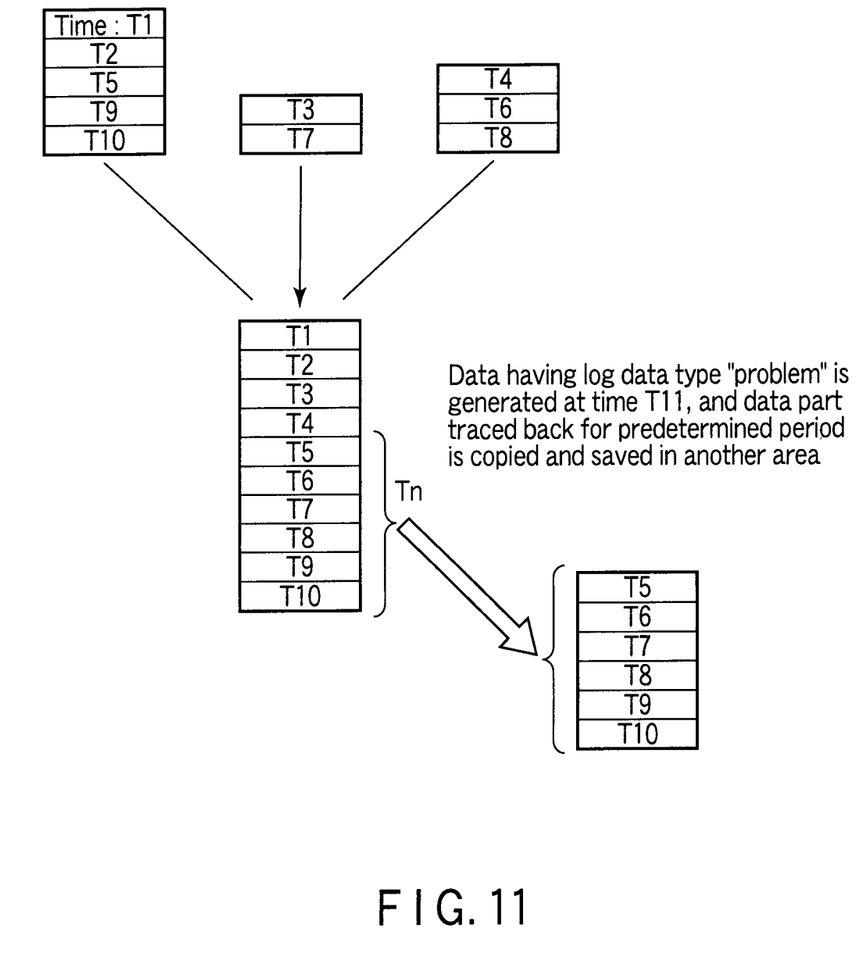
FIG. 11 is a view for explaining the operation of the sixth embodiment.

Also, a method of extracting and saving only log data traced back for a predetermined period from a problem occurrence timing is effective. According to the fifth embodiment, log data at the time of problems can be classified. Alternatively, according to the sixth embodiment, for example, when a problem has occurred at time T10, log data traced back for a pre-set period Tn are extracted and saved, as shown in FIG. 11.

As described above, the CPU 11 of each processing unit sets the log data type and occurrence time information in log data to be generated. When the log data integration unit 5 detects a specific log data type (for example, occurrence of a problem) upon determination of the log data type, it reads out an occurrence time of that log data, and copies and saves previous log data traced back for the period Tn from that occurrence time in another area of the integrated log memory 13. With this control, logs for a predetermined period before occurrence of a problem can be left, thus effectively specifying a cause of the problem. This embodiment can be implemented by conducting a search using the occurrence times of log data as a key and extracting corresponding data.

Seventh Embodiment

For example, when a detachable recording medium such as a flash memory card is used as the integrated log memory 13 in the log data integration unit 5, collected log data can be easily taken out. With this arrangement, however, during an exchange operation of the recording medium, log data cannot be saved.

Figure 12:
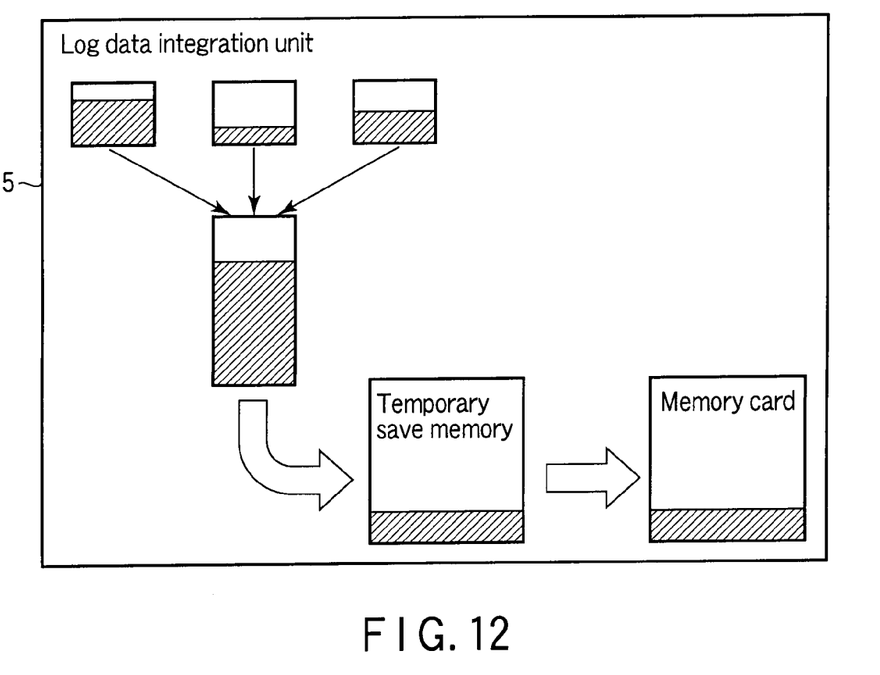
FIG. 12 is a view for explaining the operation of the seventh embodiment.
Figure 13:
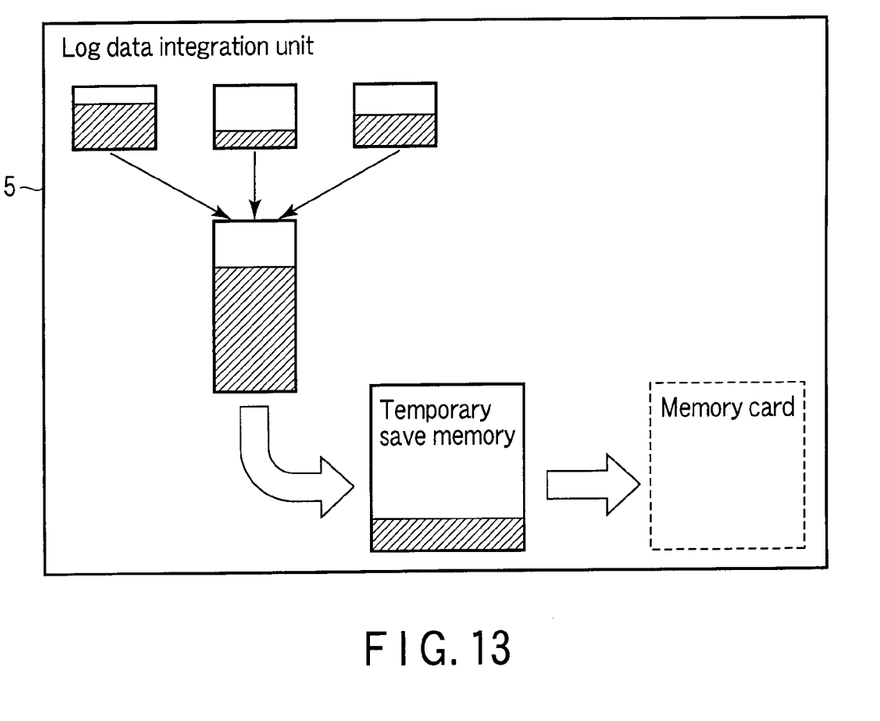
FIG. 13 is a view for explaining the operation of the seventh embodiment.
Figure 14:
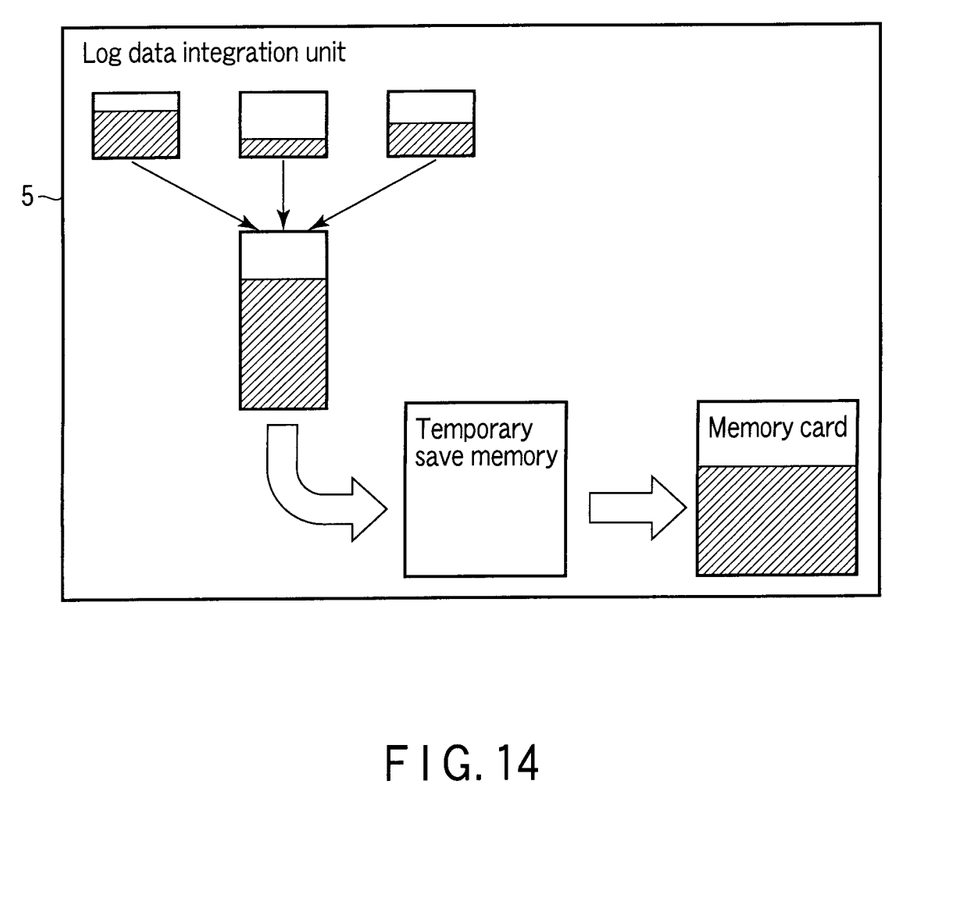
FIG. 14 is a view for explaining the operation of the seventh embodiment.

Hence, in order to allow to save log data during the exchange operation of a memory card, a log data save method adopts a method of using a work memory in a random access memory (RAM) as a temporary save destination, and transferring the temporarily saved data to the memory card, as shown in FIG. 12. That is, when the memory card is detached, as shown in FIG. 13, log data is stored in the temporary save destination. Then, after the memory card is inserted, data is transferred from the temporary save destination to the memory card, as shown in FIG. 14. Then, even during the exchange operation of the memory card, log data can be saved without any omissions.

Eighth Embodiment

As a method of saving during the exchange operation of a memory card without any omissions as in the seventh embodiment, a method that allows to use two memory cards may be adopted. At this time, a user-friendly message indicating that a first memory card as a save destination cannot be detached can be displayed. In such state, by inserting a second memory card upon taking out log data, the save destination of log data is changed from the first memory card to the second memory card, and the first memory card can be detached after it is set in a detachable state. In this case, the need for a temporary save memory can be obviated. However, the temporary save memory may be used to cope with a case in which both the memory cards are detached.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A video server comprising a plurality of processors which respectively serve as at least a recording processing unit that records video data, a playback processing unit that plays back the video data recorded by the recording processing unit, and a main control unit that controls the recording processing unit and the playback processing unit, and a log data integration unit which is connected to the plurality of processors via a common bus and integrates log data generated by the plurality of processors, each of the plurality of processors comprising:
a generation module which generates the log data including at least an event occurrence time;
a storage module which stores the log data; and
a transmission module which transmits the log data stored in the storage module to the log data integration unit via the common bus, and the log data integration unit comprising:
a reception module which receives the log data from the plurality of processors via the common bus; and
an integration module which integrates the received log data in an occurrence time order.

2. The server according to claim 1, wherein each of the plurality of processors further comprises a determination module which determines whether or not transmission processing of control data from the main control unit to one of the recording processing unit and the playback processing unit is active, and when the determination module determines that the transmission processing of the control data is active, the transmission module stands ready to transmit the log data, and when the determination module determines that the transmission processing of the control data is inactive, the transmission module transmits the log data to the log data integration unit.

3. The server according to claim 1, wherein the generation module sets, in the log data, a save level value which represents a save level of the log data in the storage module, and the storage module stores the log data when the save level value is not less than a predetermined threshold.

4. The server according to claim 1, wherein the generation module sets, in the log data, a transmission level value which represents a transmission level of the log data by the transmission module, and the transmission module transmits the log data when the transmission level value is not less than a predetermined threshold.

5. The server according to claim 1, wherein the generation module sets, in the log data, a reception level value which represents a reception level of the log data by the log data integration unit, and the reception module receives the log data when the reception level value is not less than a predetermined threshold.

6. The server according to claim 1, wherein the generation module sets a type of the log data in the log data, and the integration module selectively uses save areas depending on the types of the log data.

7. The server according to claim 1, wherein the generation module sets a type of the log data in the log data, and the integration module extracts log data for a predetermined period according to the types of the log data.

8. The server according to claim 1, wherein the integration module saves the log data in a detachable memory via a temporary save memory.

9. The server according to claim 1, wherein when log data are allowed to be saved in a plurality of detachable memories, the integration module notifies a user that the memory which is set as a save destination is inhibited from being detached, and notifies the user that the memory is detachable when the save destination is changed to the other detachable memory.

* * * * *